(12) United States Patent
Shteyn

(10) Patent No.: US 6,838,986 B2
(45) Date of Patent: Jan. 4, 2005

(54) NOTIFICATION OF USE OF NETWORK-ENABLED DEVICE

(75) Inventor: Eugene Shteyn, Cuptertino, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/962,259

(22) Filed: Sep. 25, 2001

(65) Prior Publication Data

US 2003/0058096 A1 Mar. 27, 2003

(51) Int. Cl.[7] .................................................. G08B 1/00
(52) U.S. Cl. ...................... 340/531; 340/506; 340/533; 340/514; 340/516; 340/3.1; 340/539.1
(58) Field of Search ................... 340/506, 531, 340/533, 539, 514, 516, 3.1

(56) References Cited

U.S. PATENT DOCUMENTS

| | | | |
|---|---|---|---|
| 5,872,931 A | | 2/1999 | Chivaluri |
| 6,211,782 B1 | * | 4/2001 | Sandelman et al. ......... 340/506 |
| 6,255,945 B1 | * | 7/2001 | Britton ....................... 340/539 |
| 6,373,383 B1 | * | 4/2002 | Arrowsmith et al. ....... 340/506 |

OTHER PUBLICATIONS

U.S. patent application Ser. No. 09/811,191, Shteyn, filed Mar. 16, 2001.
U.S. patent application Ser. No. 09/222,403, Cheng, filed Dec. 29, 1998.
U.S. patent application Ser. No. 09/176,171, Cheng, filed Oct. 21, 1998.

* cited by examiner

*Primary Examiner*—Daryl Pope
(74) *Attorney, Agent, or Firm*—Kevin Simons

(57) ABSTRACT

Network-enabled devices are configured to report changes of state to a monitoring system. The monitoring system is configured to filter each change of state to determine whether the change of state constitutes a reportable event, based on a profile associated with the device. If the event is reportable, it is communicated to one or more other network-enabled devices. Each device is also configured to periodically verify its presence to the monitoring system, and the unexplained absence of the device is treated as a change of state of state of the device. In like manner, a change to the profile of a device is also treated as a change of state of the device.

19 Claims, 1 Drawing Sheet

NOTIFICATION OF USE OF NETWORK-ENABLED DEVICE

BACKGROUND OF THE INVENTION

1. Field of the Invention

This invention relates to the field of electronics, and in particular to the communication of status information of devices via a network.

2. Description of Related Art

Electronic devices are increasingly becoming "network-enabled", such that communications with these devices can be effected via a network, such as the Internet. Devices and appliances in a home network, for example, are remotely controllable via an interface between the home network and the Internet. A user at a remote location can contact the home network, check the status of particular devices, turn devices on or off, and so on.

Conventionally, a user initiates the communication with the network-enabled devices. This requires the user to be proactive, and provides only sporadic glimpses of the status of devices, when the user happens to call for a status update. Also, network-enabled devices can be accessed by un-authorized users, which may result in a network or device failure, or other consequences.

BRIEF SUMMARY OF THE INVENTION

It is an object of this invention to provide a system and method for continuously monitoring the status of select network-enabled devices. It is a further object of this invention to provide a system and method for selectively reporting particular events related to network-enabled devices.

These objects, and others, are achieved by providing a monitoring system and method wherein network-enabled devices are configured to report changes of state to the monitoring system. The monitoring system is configured to filter each change of state to determine whether the change of state constitutes a reportable event, based on a profile associated with the device. If the event is reportable, it is communicated to one or more other network-enabled devices. Each device is also configured to periodically verify its presence to the monitoring system, and the unexplained absence of the device is treated as a change of state of state of the device. In like manner, a change to the profile of a device is also treated as a change of state of the device.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
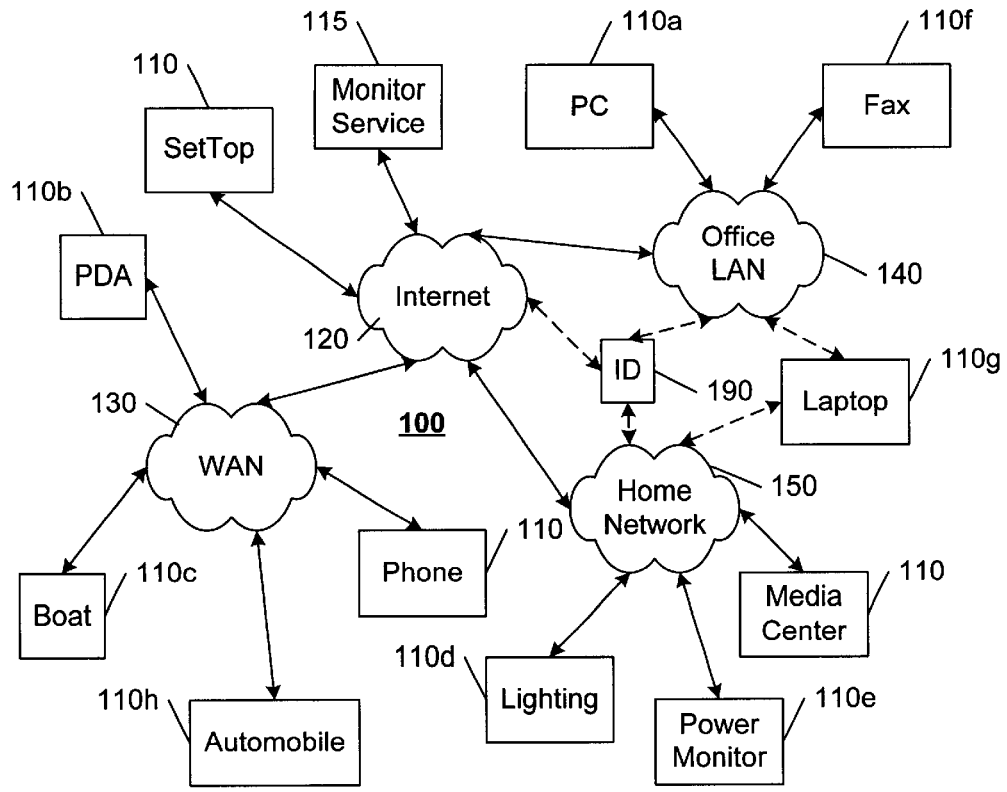
FIG. 1 illustrates an example block diagram of a network of electronic devices coupled via a plurality of networks.

FIG. 1 illustrates an example block diagram of a network 100 of electronic devices 110 coupled via a plurality of networks. These electronic devices 110, for example, communicate with the Internet 120 directly, or indirectly, via a wide area network 130, a local area network 140, a home control network 150, and so on. Other networks, not illustrated, are also common in the art, such as a "personal area network" that typically comprises personal items such as a watch, a billfold, a PDA or cell phone, connected via a Bluetooth-compliant network. A device 110 that can send and/or receive information directly or indirectly via a network is commonly termed a "network-enabled" device.

Illustrated in FIG. 1, for example, is a desktop computer (PC) 110a that is coupled to the Internet 120 via an office LAN 140, and a Personal Data Assistant (PDA) 110b that is coupled to the Internet 120 via a WAN 130, such as a dial-up connection provided by the local telephone company. Because of the common Internet 120 connection, a user with a PDA 110b can send information to the computer 110a from wherever the user happens to be. In like manner, the user with the PDA 110b may access a home control network 150 and control a lighting system 110d, via the Internet 120.

In accordance with this invention, network-enabled devices 110 are configured to transmit a change of status message via a network 100 for defined events, such as whenever they are activated. For example, the user with the PDA 110b can be notified whenever the computer 110a at the office LAN 140 is being used. If the computer 110a is not expected to be used while the user is absent from the office environment, the user can take appropriate measures, such as contacting a security service at the office environment. In a routine application, the user with a PDA 110b can be notified when a fax is received by a fax machine 110f, or notified of a power failure in a home environment via a power monitor 110e.

Figure 2:
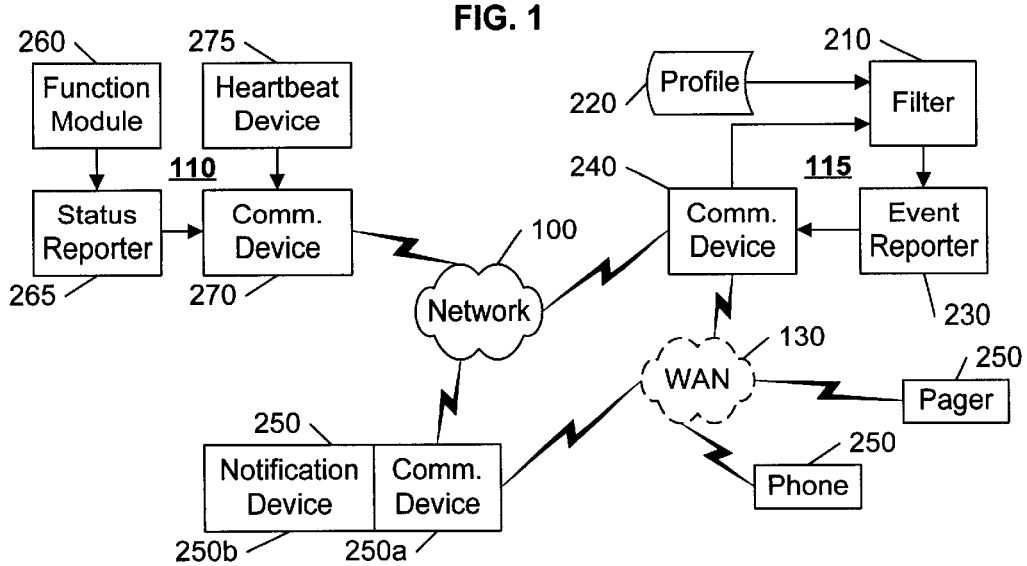
FIG. 2 illustrates an example block diagram of select devices in the network of electronic devices coupled via a network.

In a preferred embodiment of this invention, an Internet-enabled monitor service 115 is provided to facilitate the communication of reportable events. As illustrated in FIG. 2, the service 115 is configured to receive the change of status messages from network-enabled devices 110, via the Internet 120, and to route notifications to select recipients, using conventional communications schemes, such as sending a 'pager' message, a voice-recorded message, an email message, a fax message, and so on. To avoid messaging overload, the service 115 includes a filter 210 that determines whether an event at the device 110 constitutes a reportable event to a notification instrument 250. A profile 220 is associated with each monitored network-enabled device 110, or with a set of network-enabled devices 110 that identifies reportable events, or, in the alternative, identifies non-reportable events. When the filter 210 receives the change of status message from the device 110, it compares the change of status to the information contained in the profile 220. The profile 220 also provides an identification of the intended recipient(s) of the reportable event notification. If the event is reportable, the filter 210 provides the event notification information to an event reporter 230 that is configured to initiate the appropriate communications activity to effect the notification. A communications device 240 provides the access to the appropriate Internet 120 or WAN 130 communications network, or others, to effect the notification.

In a preferred embodiment of this invention, a hierarchical reporting and filtering process is employed. Each network-enabled device 110 is configured to report particular events, or changes of state, related to that device, or to a class of devices. Each network-enabled device 110 will generally send the status reports to a plurality of other network-enable devices 110, and these other network-enabled devices 110 are configured to subsequently re-transmit select status reports to the service 115. In this manner, events that are considered significant are communicated redundantly to the service 115, to increase the reliability of the system. The service 115 is configured to filter the multiple reports so as to minimize multiple notifications to the notification instrument 250. Additionally, the service 115 is preferably configured to consider a lack of redundant notification from particular devices 110 as reportable events.

The notification instrument 250 is any device that can receive a message from the communications device 240 at the monitor service 115, and typically includes a communications receiver 250a and a notification device 250b. In a simple example, the instrument 250 is a telephone, and the receiver 250a is either a wired or a wireless device coupled to a speaker 250b for the user to listen to an audio message from the event reporter 230. In another example, the communications device 250a is a switchboard at a security service that routes a text message to a display device 250b at a security monitoring station. A security person may then contact the authorized user of the device 110 that reported the activity to determine whether the activity is authorized, and take appropriate action thereafter. Alternatively, the notification instrument 250 may be a component of a network-enabled device 110, or a component of the monitor service system 115. As noted above, the notification instrument 250 is preferably configured to effect a remedial action for some or all of the reported events.

An example block diagram of a typical network-enabled device 110 is also illustrated in FIG. 2. The example device 110 includes a function module for providing the intended function of the device 110, such as a facsimile receiving and transmitting module in a facsimile machine 110f in FIG. 1. The example device 110 also includes a status reporter 265 that is configured to provide the aforementioned change of status reports to the monitor service 115, via the network 100, based on information provided by the function module 260. In a basic embodiment, the status reporter 265 is configured to report whether the function module 260 is activated. In a preferred embodiment, the status reporter 265 is configurable to allow the select reporting of different states of the function module 260, such as whether the module 260 is activated for transmission or reception, whether the module 260 is experiencing problems (error reporting), and so on. In the example of the boat 110c of FIG. 1, the status reporter 265 may be configured to report whether the ignition is turned on, as well as periodically reporting the boat's location, via a coupling to a GPS receiver within the function module 260. In this manner, a theft of the boat 110c will effect a notification to the user, via a message indicating that the ignition has been activated, and subsequently aid in the recovery of the stolen boat via the location messages. In like manner, when a user plans an extended voyage, the user may include the intended route of the boat 110c in the profile 220 of FIG. 2, and instruct the filter 210 to notify the Coast Guard if the location messages indicate a significant variance from this course, or a lack of progress along this course. In this example, the communications device 270 in the device 110 may be a satellite transmitter/receiver that provides dial-in access to the Internet 120.

In a preferred embodiment of this invention, the network-enabled device 110 is also configured to facilitate verification that the device 110 is connected to the network 100. Illustrated in FIG. 2 is a "heartbeat" device 275 that is configured to periodically transmit a "heartbeat" to the monitor service 115. Correspondingly, the monitor service 115 is configured to expect this heartbeat from the device 110 at regular intervals, or at pre-determined times, or at other pre-arranged intervals. Alternatively, the monitor service 115 may be configured to send a periodic query at regular intervals, and the heartbeat device 275 is configured to acknowledge receipt of the query, via the network 100. Preferably, the interval duration is contained in the profile 220 for each device, or each set of devices. If the profile 220 does not contain a specified heartbeat duration, a default value is used, which may be an 'infinite' duration, indicating that the device need not periodically report a heartbeat. If the monitor service 115 does not receive the heartbeat after the interval duration, and this lack-of-heartbeat is specified in the profile 220 as a reportable event, the event reporter 230 transmits a corresponding message to a notification instrument 250, as detailed above.

In a preferred embodiment, the profile 220 may contain 'dynamic' and 'multi-dimensional' rules and criteria for determining whether a change of state at a device 110 constitutes a reportable event. Illustrated in FIG. 1, for example, is an identification device 190 that is also coupled to the Internet 120, either directly or indirectly. In a preferred embodiment of this invention, the identification device 190 is configured to enable a determination of a user's location, and the filter 210 is configured to determine whether an event is reportable based upon the user's location, as specified in the profile 220. For example, if the identification device 190 is coupled to the Internet 120 via the home network 150, indicating that the user is at home, the profile 220 may be configured to indicate that only particular events from the devices 110a and 110f on the office LAN 140 should be reported to the user. In like manner, the user's location may be implicitly or explicitly provided to the monitor service 115 for location-dependent filter processing. For example, when a user initially activates the PC 110a on the office LAN 140, an event may be reported by the monitor service 115. Subsequently, the monitor system 115 may be configured to assume that the user is now at the office, absent notification to the contrary. Similarly, the profile 220 may include time-of-day parameters that determine whether particular events are reportable. For example, events from the devices 110a, 110f on the office LAN 140 may be specified to be reportable only if they occur outside of normal business hours. Also similarly, the profile 220 may include rules and criteria that are based on the status of multiple network-enabled devices 10. For example, if a user plans to either spend the day driving or boating, the user may instruct the filter 210, via the profile 220, not to report the status of the boat 110c or automobile 110h, except if both devices contemporaneously report an active state. In this manner, while the user is on the boat 110c, an activation of the automobile 110h will produce a reportable event.

In a preferred embodiment, the notification instrument 250 is configurable to effect an automated response to particular events. For example, an event is reported to the notification instrument when PC 110a on the office LAN 140 sends a communication, such as an e-mail message, while the keyboard, or any other input peripheral (not shown) of the PC 110a is not activated. Such an event may indicate that the PC 110a is infected by a software worm, and the notification instrument 250 may automatically activate an internal or external anti-virus application upon receipt of the notification.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the profile 220 may be created by, or modified by, a learning system that is configured to learn a routine itinerary of events associated with a particular user, or with a particular set of devices 110. Thereafter, some or all of the events may be considered reportable only if they differ substantially from the routine itinerary. In like manner, the notification device 250 may be configured to allow a response to each notification, so that a user may easily modify the profile 220 by providing feedback, such as "don't notify me for this event in the future", or "don't notify me of this event if it occurs around this time-of-day in the future", and so on. In like manner, the monitor service 115 may routinely process the profile 220 to determine which events from a device 110 are never reportable, and thereafter instruct the device 110 to cease transmission of these events until notified otherwise. These and other system configuration and optimization features will be evident to one of ordinary skill in the art in view of this disclosure, and are included within the scope of the following claims.

I claim:

1. A monitor service system comprising:

a communications device that is configured to receive a plurality of change of status messages from a network-enabled device, via a network communications path, a filter, operably coupled to the communication device, that is configured to select one or more of the plurality of change of status messages as reportable events, based on a profile that is associated with the network-enabled device, and an event reporter, operably coupled to the filter, that is configured to effect notification of the one or more reportable events to a notification instrument, wherein the communication path includes at least one of:

a home-control network, a personal area network.

2. The monitor service system of claim 1, wherein the event reporter is further configured to effect a notification of a lack of communication with the network-enabled device, based on whether a heartbeat signal has been received from the network-enabled device within a specified duration of time.

3. The monitor service system of claim 2, wherein the profile indicates the specified duration of time for receiving the heartbeat signal, and the filter is further configured to determine whether the heartbeat signal has been received from the network-enabled device within the specified duration of time.

4. The monitor service system of claim 1, wherein the filter is further configured to determine whether each of the plurality of change of status messages corresponds to the reportable event based on at least one of:

a user location, a time-of-day parameter, a location of the network-enabled device, and a status of another network-enabled device.

5. The monitor service system of claim 1, further comprising a learning system that is configured to learn a routine itinerary of events associated with a particular user.

6. The monitor service system of claim 1, further including the notification instrument.

7. The monitor service system of claim 6, wherein the notification instrument is configured to effect remedial action upon receipt of the notification of the one or more reportable events.

8. An apparatus comprising:

a communications device that is configured to facilitate communication to a monitoring system via a network communications path, and a status reporter, operably coupled to the communications device, that is configured to report an activation of the apparatus to the monitoring system, via the communications device, to facilitate select notification of the activation of the apparatus to a notification instrument associated with the apparatus, based on a profile at the monitoring system that is associated with the apparatus, wherein the communication device is configured to operate in a communication path that includes at least one of:

a home-control network, a personal area network.

9. The apparatus of claim 8, further including:

a heartbeat device, operably coupled to the communications device, that is configured to periodically communicate a heartbeat signal to the monitoring system to facilitate a verification of communications via the network communications path.

10. The apparatus of claim 8, wherein the apparatus includes one of:

a computer device, a vehicle, and a telephone.

11. The apparatus of claim 8, wherein the status reporter is further configured to report select changes of state of the apparatus.

12. The apparatus of claim 8, wherein the profile comprises a learning system that is configured to learn a routine itinerary of events associated with a particular user.

13. The apparatus of claim 8, further including an other notification instrument that is configured to receive an other notification of activation of an other network-enabled apparatus.

14. The apparatus of claim 13, wherein the other notification instrument is configured to effect a remedial action upon receipt of the other notification of activation.

15. A method of providing status information regarding a network-enabled device, comprising:

receiving a plurality of change of status messages from the network-enabled device via a network communications path, filtering the change of status message to determine which of the plurality of change of status messages corresponds to a reportable event, based on a profile that is associated with the network-enabled device, and notifying a notification instrument of the reportable event.

16. The method of claim 15, further including notifying the notification instrument of a lack of communication with the network-enabled device, based on whether a heartbeat signal has been received from the network-enabled device within a specified duration of time.

17. The method of claim 16, wherein the profile indicates the specified duration of time for receiving the heartbeat signal.

18. The method of claim 15, wherein
determining which of the plurality of change of status messages corresponds to the reportable event is based on at least one of:
- a user location,
- a time-of-day parameter,
- a location of the network-enabled device, and
- a status of another network-enabled device.

19. The method of claim 15, wherein
the network communications path includes at least one of:
- an Internet network,
- a home-control network,
- a personal area network,
- a local area network, and
- a wide area network.

* * * * *